Jan. 1, 1952   F. W. HOCHMUTH   2,580,385
SPRAY NOZZLE WITH CLEANING MEANS
Filed Sept. 1, 1948
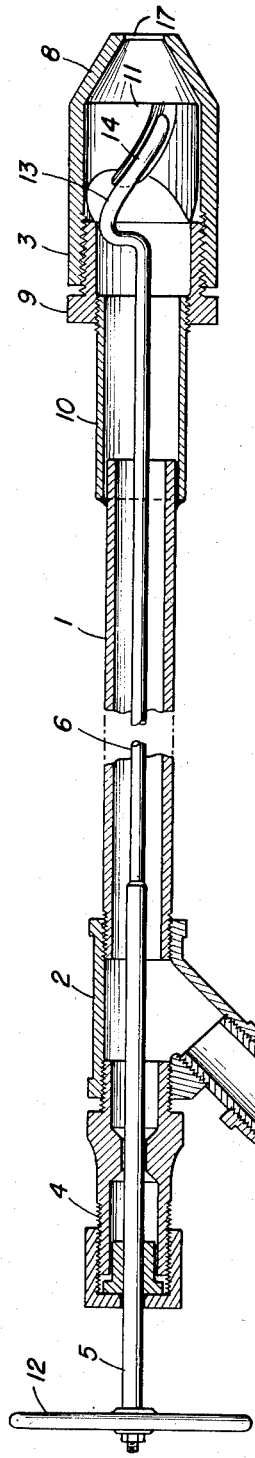
Fig. 1.
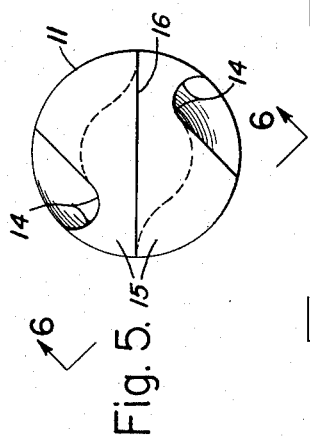
Fig. 5.
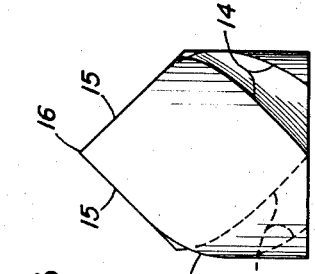
Fig. 4.
Fig. 2.
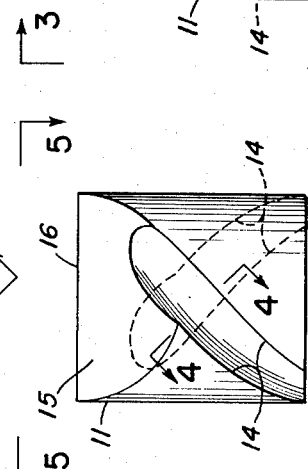
Fig. 3.
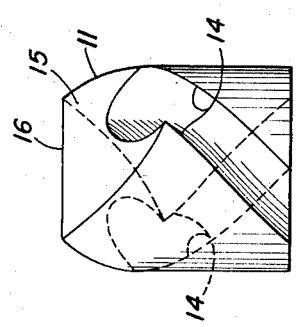
Fig. 6.
INVENTOR
Frank W. Hochmuth
BY
ATTORNEY Patented Jan. 1, 1952

2,580,385

UNITED STATES PATENT OFFICE 2,580,385

SPRAY NOZZLE WITH CLEANING MEANS

Frank W. Hochmuth, Summit, N. J., assignor to Combustion Engineering-Superheater, Inc., a corporation of Delaware Application September 1, 1948, Serial No. 47,235

4 Claims. (Cl. 299—114)

This invention relates to nozzle means for discharging heavy fluids and particularly improved nozzle means for spraying heavy black liquor of wood pulp mills into a smelting furnace in a system for recovering chemical from the black liquor.

Briefly, the system ordinarily employed comprises a smelter furnace from which the products of combustion pass through a waste heat boiler and thence through an evaporator. The black liquor from the digestion of the wood pulp is reduced to the desired density or concentration of solids and is then sprayed into the furnace in a heated condition wherein it is evaporated while in suspension to dryness sufficient to sustain combustion of the combustible matter in the chemical falling onto the hearth. Due to the heat of combustion on the hearth, reduction of chemical takes place and the reduced chemical runs from the hearth in a molten state. The chemical is then converted to so-called white liquor and re-used as a solvent for the wood pulp in the digestors. The products of combustion rising from the hearth into the furnace furnish the heat for evaporation of the sprayed-in black liquor.

It is important that the liquor be sprayed into furnaces in heavy and relatively coarse form so that the black ash formed be in heavy and relatively coarse particles which enclose or seal the chemical so as to carry the latter onto the hearth to be there reduced. The chemical flows as a liquid from the hearth in a molten state. Finely atomized particles are undesirable in that they expose a relatively large surface in the form of fine particles to the hot gases rising within the furnace and sublimate and pass out of the furnace as a gas or fume or are carried out in suspension. This condition causes an excess of objectionable deposit of condensing chemical upon the heat absorbing surface associated with the furnace, such as steam boiler heating surface, and furthermore results in an undesirable loss of chemical from the recovery unit.

A spray nozzle providing the desirable ashing conditions mentioned above is of the type disclosed in the application for patent by A. L. Hamm, Serial Number 587,812, filed April 11, 1945, now Patent No. 2,555,337, dated June 5, 1951. However, I have found that the continuity of satisfactory operation of said spray has been interrupted by the clogging of the nozzle even with the relatively large ports provided for the liquor in the sprayer plate.

It is an object of this invention to provide improved nozzle means for spraying heavy black liquor into a smelting furnace in a system for recovering chemical from black liquor.

How the foregoing, together with other objects and advantages as may hereinafter appear or are incident to my invention are realized, is illustrated in preferred form in the accompanying drawings, wherein:

Figure 1 shows a nozzle pipe assembly with my improved nozzle head including the slug-shaped sprayer plate and the cleaning rod.

Figure 2 is an elevation of the sprayer plug.

Figure 3 is a side view of the sprayer plug shown in Figure 2.

Figure 4 is a section taken on line 4—4 of Figure 3 showing the shape of a spiral groove in the sprayer plug.

Figure 5 is a plan view of Figure 3.

Figure 6 is an elevation of the sprayer plug taken on line 6—6 of Figure 5.

In Figure 1 nozzle pipe 1 is provided at its outer or rearward end with a T member 2 and at its inner or forward end with a spray nozzle head 3. Connected to the other end of the T 2, on the straight run, is a stuffing box 4 rearwardly through which the stem 5 of cleaning rod 6 projects. Connected to the side outlet of the T 2 is a pipe 7 through which the liquor to be sprayed is delivered to the nozzle pipe 1.

The nozzle head 3 comprising a sprayer cap 8 is secured to a bushing 9 which in turn is secured to a nipple 10 of larger diameter than the nozzle pipe 1. Within the sprayer cap 8 is a plug-shaped sprayer plate 11 held within the nozzle by a bushing 9 which presses the sprayer plug 11 against the inside of the conical portion of the sprayer cap 8. This assemblage of cap and plug elements 8 and 11 may appropriately be called the sprayer head.

The cleaning rod 6 extends from the plug-shaped sprayer plate 11 through the nozzle pipe 1 and rearwardly out through the stuffing box 4 to a hand wheel 12 fastened to the rod. The forward or nozzle end of the cleaning rod 6 is first offset toward the inside surface of the bushing 9 and thence extends in a helical shaped end 13 toward the sprayer plug 11. The radius and pitch of the helix of end 13 of the cleaning rod 6 is the same as the radius and pitch of the helical grooves 14 in the cylindrical side of the sprayer plug 11 so that when the rod 6 is moved forwardly or backwardly while being rotated, it will freely travel into and out of a groove 14.

The outer end of the sprayer plug 11 is provided with inclined surfaces 15, preferably intersecting in a line 16 passing through a diameter of the plug 11. The surfaces 15 slope from line 16 forwardly and outwardly and terminate with their most advanced portions substantially at the entrance of the respective grooves 14.

In the operation of the nozzle, the cleaning rod 6 is retracted rearwardly so that the cleaning rod is disengaged from the spray grooves 14 of the plug-shaped sprayer plate 11. Black liquor enters through pipe 7 and flows through nozzle pipe 1 toward the nozzle head 3. In passing through the spray plug 11 the black liquor is given a spinning motion by the helical spray grooves 14, after which it is discharged through the opening 17 of the sprayer cap 8 in the form of a hollow cone. The angle of this cone can be controlled by the size of the discharge hole 17 in the cap 8 and the quantity of liquor handled at a given pressure can be taken care of by providing spray plugs 11 with varying sizes of the spray grooves 14.

The novel feature of this black liquor spray assembly is the cleaning means which makes use of the cleaning rod and which allows the grooves 14 in the plug-shaped sprayer plate 11 to be cleaned without either shutting off the liquor flow to the nozzle or disassembling the spray nozzle head assembly. The cleaning action is obtained by merely pushing the cleaning rod 6 forward by hand wheel 12 so that the rod end 13 enters one of the grooves 14 in said sprayer plug 11. A forward and rotating motion of the rod then carries end 13 thereof completely through a groove 14 of the sprayer plug 11 thereby dislodging any lumps of hardened black liquor or pieces of salt cake, scale or other foreign matter that may have become lodged in the groove.

The novel feature which allows the cleaning rod 6 to selectively engage either one of the two spray grooves 14 is the wedged-shaped rearward end 15—16 of the spray plug 11. If one spray groove 14 has been cleaned and it is desired to clean the one diametrically opposite, all that is required is to withdraw the cleaning rod 6 and rotate it through 180 degrees after which it will be in the proper position to clean the other spray groove 14. It does not matter whether the inner or forward end 13 of the cleaning rod is in exact alignment with the rearward end of a groove 14 in the sprayer plug 11, because the inclined surfaces 15 at the rearward end of the sprayer plug 11 will guide said end 13 of the cleaning rod ridectly into the respective groove. The offset helically shaped end 13 of the cleaning rod having the same radius and pitch of the helical grooves 14, provides a free movement of said end through the grooves.

While I have shown and described the preferred embodiment of my invention, it will be understood that changes in construction, combination and arrangements of parts may be made without departing from the spirit and scope of the invention as claimed.

What I claim is:

1. In a spray nozzle for use with heavy fluid, the combination of a nozzle pipe, means for delivering the fluid to be sprayed into said pipe, a sprayer cap mounted on the forward end of said pipe and provided with an opening for discharge of the fluid, a sprayer plug positioned within said cap and having in the sides thereof adjacent the cap wall at least two separate helical grooves for conveying the fluid from the pipe interior to the sprayer cap opening while imparting rotation thereto, each of said grooves terminating in an individual inclined surface on the rearward end of said plug which surface extends rearwardly and inwardly toward the plug center, a cleaning rod disposed within said pipe with space for fluid passage therearound and having the forward end thereof adjacent said rearward end of the sprayer plug shaped in the form of a partial helix with pitch and radius substantially matching said helical grooves and of size smaller than the groove size so as to be freely insertable therein, and means including an extension of said rod through a stuffing box in said nozzle pipe's rearward end for permitting exterior manipulation of said rod whereby through such manipulation said sprayer plug's aforesaid separate helical grooves may be cleaned by selective insertion therein of the rod's said forward end and whereby the aforesaid inclined surfaces on the rear plug end serve upon rotation and axial movement of the cleaning rod to guide that forward rod end into each groove and to facilitate transfer of the rod end from one groove to another.

2. In a spray nozzle, the combination of a nozzle pipe, means delivering the fluid to be sprayed into said pipe, a sprayer cap mounted on the forward end of said pipe and having a forward opening for discharge of said fluid, a sprayer plug mounted in said cap, means providing at least two separate helical grooves in the sides of the sprayer plug adjacent the sprayer cap wall for conveying the fluid from the pipe interior to the sprayer cap opening and imparting rotation thereto, means providing the rearward end of said sprayer plug with individually inclined surfaces respectively embracing the rearward ends of said separate helical grooves and respectively extending therefrom rearwardly and inwardly toward the center of the plug whereby the forwardmost portion of each surface coincides with the rearward entrance into its associated groove, a cleaning rod in said nozzle pipe having its forward end adjacent the sprayer plug shaped in the form of a partial helix of substantially the same radius and pitch of said helical grooves and of a size smaller than said grooves so as to be freely insertable therein, and means including a rearward extension of said rod through a sealed joint in said nozzle pipe for permitting exterior manipulation of said rod whereby through such manipulation said sprayer plug's aforesaid separate helical grooves may be cleaned by selective insertion therein of the rod's said forward end and whereby the aforesaid inclined surfaces on the rear plug end serve upon rotation and axial movement of the cleaning rod to guide that forward rod end into each groove and to facilitate transfer of the rod end from one groove to another.

3. In a spray nozzle for delivering black liquor of wood pulp mills into a smelting furnace in a system for recovering chemical from the black liquor, the combination of a nozzle pipe adapted to have black liquor supplied thereinto, a sprayer cap concentrically mounted on the forward end of said pipe and having a forward opening centered on the axis of the pipe for discharge of black liquor; a sprayer plug concentrically fitted into said cap and having at least two circumferentially spaced helical grooves in the sides of the sprayer plug adjacent the sprayer cap arranged equidistant from and at an angle to the axis of the pipe for conveying the liquor from the pipe interior to the sprayer cap opening and imparting rotation thereto, means providing the rearward end of said sprayer plug with individually inclined surfaces respectively embracing the rearward ends of said separate grooves and respectively extending therefrom rearwardly and inwardly toward the axis of the pipe, a cleaning rod in said nozzle pipe having its end adjacent the sprayer plate shaped in the form of a partial helix at substantially the same angle to and distance from the axis of the pipe as said grooves and of a size smaller than said grooves so as to be freely insertable therein, and means including a rearward extension of said rod through a stuffing box in said nozzle pipe for permitting exterior manipulation of said rod whereby through such manipulation said sprayer plug's aforesaid separate helical grooves may be cleaned by selective insertion therein of the rod's said forward end and whereby the aforesaid inclined surfaces on the rear plug end serve upon rotation and axial movement of the cleaning rod to guide that forward rod end into each groove and to facilitate transfer of the rod end from one groove to another.

4. In a spray nozzle for use with heavy fluids, the combination of a nozzle pipe adapted to have the fluid to be sprayed delivered thereinto, a cylindrical sprayer cap mounted on the forward end of said pipe and having a forwardly contracted portion with an opening therein for discharge of said fluid forwardly therefrom, a cylindrical sprayer plug fitted into said cap and having first and second diametrically opposite helical grooves in the cylindrical surface of the plug for conveying the fluid forwardly from the pipe interior to the sprayer cap opening and imparting rotation thereto, means providing the rearward end of said sprayer plug with first and second inclined surfaces respectively embracing the rearward ends of said first and second helical grooves and respectively extending therefrom inwardly and rearwardly toward and intersecting on a diameter of the plug which is substantially at right angles to a line passing through the rearward ends of the grooves whereby the forwardmost portion of each surface coincides with the rearward entrance into its associated groove, a cleaning rod in said nozzle pipe having its forward end adjacent the sprayer plug shaped in the form of a partial helix of substantially the same radius and pitch of said helical grooves and of a size smaller than said grooves so as to be freely insertable therein, and means including a rearward extension of said rod through a stuffing box in said nozzle pipe for permitting exterior manipulation of said rod whereby through such manipulation said sprayer plug's aforesaid first and second helical grooves may be cleaned by selective insertion therein of the rod's said forward end and whereby the aforesaid inclined surfaces on the rear plug end serve upon rotation and axial movement of the cleaning rod to guide that forward rod end into each groove and to facilitate transfer of the rod end from one groove to the other.

FRANK W. HOCHMUTH.

REFERENCES CITED

The following references are of record in the file of this patent:

UNITED STATES PATENTS

| Number | Name | Date |
|---|---|---|
| 469,108 | White et al. | Feb. 16, 1892 |
| 748,608 | Hueni | Jan. 5, 1904 |
| 836,931 | Koepnick | Nov. 27, 1906 |
| 1,060,164 | Coen | Apr. 29, 1913 |
| 1,381,734 | Parker et al. | June 14, 1921 |
| 1,442,356 | Parker | Jan. 16, 1923 |
| 1,493,795 | Tyler | May 13, 1924 |

FOREIGN PATENTS

| Number | Country | Date |
|---|---|---|
| 501,371 | Great Britain | Feb. 27, 1939 |